(12) United States Patent
Stenfort et al.

(10) Patent No.: US 7,181,562 B1
(45) Date of Patent: Feb. 20, 2007

(54) WIRED ENDIAN METHOD AND APPARATUS FOR PERFORMING THE SAME

(75) Inventors: Ross Stenfort, San Jose, CA (US); John Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 247 days.

(21) Appl. No.: 10/816,338

(22) Filed: Mar. 31, 2004

(51) Int. Cl.
*G06F 13/36* (2006.01)
*G06F 13/00* (2006.01)
*G06F 7/38* (2006.01)
*G06F 13/12* (2006.01)

(52) U.S. Cl. .................. 710/315; 710/74; 710/62; 710/100; 712/204; 712/225; 717/159; 717/162; 709/250

(58) Field of Classification Search ............ 710/315; 711/217; 712/300
See application file for complete search history.

(56) References Cited

U.S. PATENT DOCUMENTS

| | | | |
|---|---|---|---|
| 5,948,099 A * | 9/1999 | Crawford et al. | 712/225 |
| 6,472,975 B1 * | 10/2002 | Beigel et al. | 340/10.1 |
| 6,622,187 B1 * | 9/2003 | Brune et al. | 710/100 |
| 6,965,956 B1 * | 11/2005 | Herz et al. | 710/74 |
| 2006/0004935 A1 * | 1/2006 | Seto et al. | 710/62 |

* cited by examiner

*Primary Examiner*—Paul R. Myers
*Assistant Examiner*—Brian Misiura
(74) *Attorney, Agent, or Firm*—Martine Penilla & Gencarella, LLP

(57) ABSTRACT

A method and associated apparatus is provided for operating an electronic device in accordance with a wired endian format. More specifically, the wired endian format requires multi-byte values be maintained in transmit order. The wired endian format is defined to allow for interfacing with both a big endian format and a little endian format. Thus, a device operating in accordance with the wired endian format is able to interface with both a device operating in accordance with the big endian format (e.g., a Serial Attached SCSI (SAS) device) and a device operating in accordance with the little endian format (e.g., a Serial ATA (SATA) device). Furthermore, since the device operating in accordance with wired endian format implements circuitry compliant with the wired endian format, duplication of circuitry to define separate data paths for interfacing with the big endian and little endian formats, respectively, is avoided.

9 Claims, 4 Drawing Sheets

WIRED ENDIAN METHOD AND APPARATUS FOR PERFORMING THE SAME

BACKGROUND

1. Field of the Invention

The present invention relates generally electronic device communication.

2. Description of the Related Art

In modern computing systems, multi-byte values are conventionally stored in either a big endian format or a little endian format. Also, it is generally required that a particular format be applied consistently to ensure compatibility between various components of the computing system. The big endian and little endian formats and the necessity for their consistent application is described below with respect to FIGS. 1A through 1C.

FIG. 1A is an illustration showing an exemplary sequence of bytes to be used as a basis for describing a big endian format and a little endian format. Byte 0 includes bits 0 through 7. Byte 1 includes bits 8 through 15. Byte 2 includes bits 16 through 23. Byte 3 includes bits 24 through 31. For discussion purposes, Byte 3 is defined to be the most significant byte (MSB), and Byte 0 is defined to be the lease significant byte (LSB).

FIG. 1B is an illustration showing the sequence of bytes of FIG. 1A stored in contiguous memory locations in accordance with the big endian format. The big endian format requires the sequence of bytes to be stored in consecutive order with the MSB, Byte 3 in the present example, being stored in the lowest memory location relative to the other bytes in the sequence. The lowest memory location is identified as "Base Address." The next three higher memory locations are identified in increasing order as "Base Address+1", "Base Address+2", and "Base Address+3." The big endian format also requires the sequence of bytes to be transmitted in consecutive order with the MSB being transmitted first. Thus, in the big endian format as shown in FIG. 1B, the sequence of bytes are transmitted in consecutive order from the "Base Address" to the "Base Address+3." It will be apparent to those skilled in the art that the Serial Attached SCSI (SAS) protocol utilizes the big endian format.

FIG. 1C is an illustration showing the sequence of bytes of FIG. 1A stored in contiguous memory locations in accordance with the little endian format. The little endian format requires the sequence of bytes to be stored in consecutive order with the LSB, Byte 0 in the present example, being stored in the lowest memory location relative to the other bytes in the sequence. Again, the lowest memory location is identified as "Base Address", and the next three higher memory locations are identified in increasing order as "Base Address+1", "Base Address+2", and "Base Address+3." The little endian format also requires the sequence of bytes to be transmitted in consecutive order with the LSB being transmitted first. Thus, in the little endian format as shown in FIG. 1C, the sequence of bytes are transmitted in consecutive order from the "Base Address" to the "Base Address+3." It will be apparent to those skilled in the art that the Serial ATA (SATA) protocol utilizes the little endian format.

Through comparison of the big endian format in FIG. 1B and the little endian format in FIG. 1C it is apparent that the big endian and little endian formats are incompatible with each other. Essentially, the big endian and little endian formats are backwards with respect to each other. Thus, it is difficult to efficiently define a device that is capable of interfacing and operating with both the big endian and the little endian formats. A conventional approach for defining a device that is compliant with both the big endian and the little endian formats (i.e., the SAS and SATA protocols) has required the implementation of two independent data paths and two independent codes sets for controlling the data paths. Thus, the conventional approach has suffered from inefficient duplication of essentially equivalent circuitry components and associated code sets to support each of the independent data paths.

In view of the foregoing, a solution is needed for enabling a single device to communicate with both SAS and SATA protocol devices, i.e., both big endian and little endian devices, respectively, without requiring inefficient duplication of essentially equivalent circuitry components and associated code sets.

SUMMARY

The present invention provides a method and associated apparatus for operating an electronic device in accordance with a wired endian format. More specifically, the wired endian format requires multi-byte values be maintained in transmit order. The wired endian format is defined to allow for interfacing with both a big endian format and a little endian format. Thus, a device operating in accordance with the wired endian format as described herein is able to interface with both a device operating in accordance with the big endian format (e.g., a Serial Attached SCSI (SAS) device) and a device operating in accordance with the little endian format (e.g., a Serial ATA (SATA) device). Furthermore, since the device operating in accordance with wired endian format implements circuitry compliant with the wired endian format, duplication of circuitry to define separate data paths for interfacing with the big endian and little endian formats, respectively, is avoided.

In one embodiment, an apparatus defined to communicate electronically with each of a SAS protocol device and a SATA protocol device is disclosed. The apparatus includes a phy configured to connect the apparatus to each of the SAS protocol device and the SATA protocol device. The apparatus also include wired endian logic configured to communicate through the phy with either the SAS protocol device or the SATA protocol device. The wired endian logic is further configured to interface a wired endian format of the apparatus with each of a big endian format of the SAS protocol device and a little endian format of the SATA protocol device. The apparatus also includes internal circuitry configured to operate in accordance with the wired endian format.

In another embodiment, a method for operating a wired endian device to perform a transmission operation is disclosed. The method includes an operation for identifying a sequence of bytes to be transmitted as one of a control sequence of bytes and a data sequence of bytes. The sequence of bytes to be transmitted is maintained in a wired endian format. The method also includes converting the sequence of bytes from the wired endian format to a native format upon identifying the sequence of bytes as representing a data sequence of bytes. The native format represents a format associated with a device to which the sequence of bytes is to be transmitted. For example, if the sequence of bytes is to be transmitted to either a SAS device or a SATA device, the native format will be either big endian or little endian, respectively. Also in the method, the data sequence of bytes, having been identified as such, is processed to generate cyclic redundancy check data and provide scrambling of the associated data. Once the data sequence of bytes is processed, the method includes converting the data sequence of bytes from the native format to the wired endian format. The method further includes transmitting the sequence of bytes in accordance with the wired endian format.

In another embodiment, a method for operating a wired endian device to receive a transmission is disclosed. The method includes receiving a sequence of bytes in a native format, wherein the native format is associated with a device from which the sequence of bytes was transmitted. For example, if the sequence of bytes was transmitted from either a SAS device or a SATA device, the native format will be either big endian or little endian, respectively. The method also includes an operation for identifying the sequence of bytes in the native format as representing one of a control sequence of bytes and a data sequence of bytes. The method also includes processing the sequence of bytes in the native format upon identifying the sequence of bytes as representing a data sequence of bytes. The processing includes unscrambling the data associated with the data sequence of bytes and generating cyclic redundancy check data. The method further includes converting the sequence of bytes from the native format to a wired endian format. For the data sequence of bytes, the conversion from the native format to the wired endian format is performed following processing of the data sequence of bytes.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention provides a method and associated apparatus for operating an electronic device in accordance with a wired endian format. More specifically, the wired endian format requires multi-byte values be maintained in transmit order. The wired endian format is defined to allow for interfacing with both a big endian format and a little endian format. Thus, a device operating in accordance with the wired endian format as described herein is able to interface with both a device operating in accordance with the big endian format (e.g., a SAS device) and a device operating in accordance with the little endian format (e.g., a SATA device). Furthermore, since the device operating in accordance with wired endian format implements circuitry compliant with the wired endian format, duplication of circuitry to define separate data paths for interfacing with the big endian and little endian formats, respectively, is avoided.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
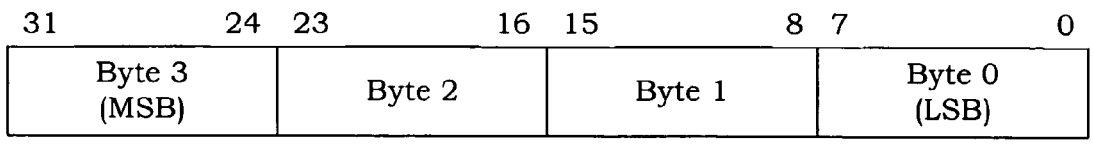
FIG. 1A is an illustration showing an exemplary sequence of bytes to be used as a basis for describing a big endian format and a little endian format.
Figure 1B:
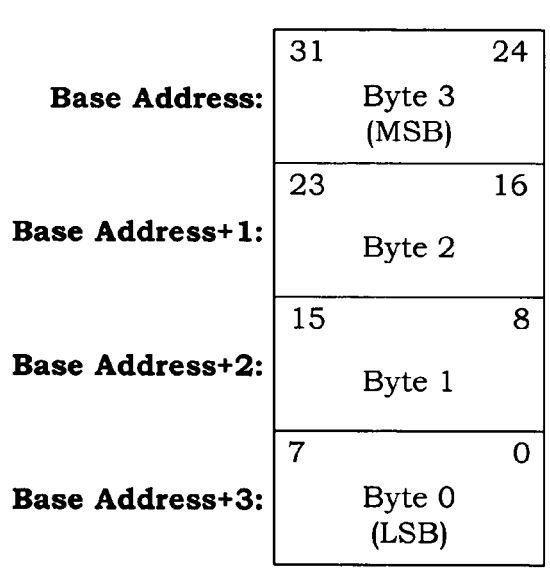
FIG. 1B is an illustration showing the sequence of bytes of FIG. 1A stored in contiguous memory locations in accordance with the big endian format.
Figure 1C:
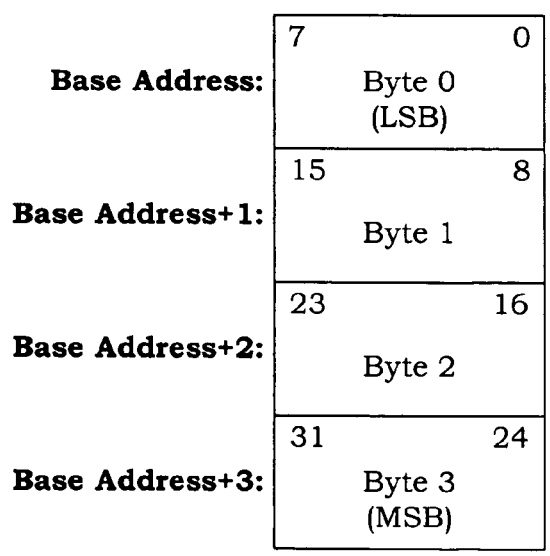
FIG. 1C is an illustration showing the sequence of bytes of FIG. 1A stored in contiguous memory locations in accordance with the little endian format.
Figure 2:
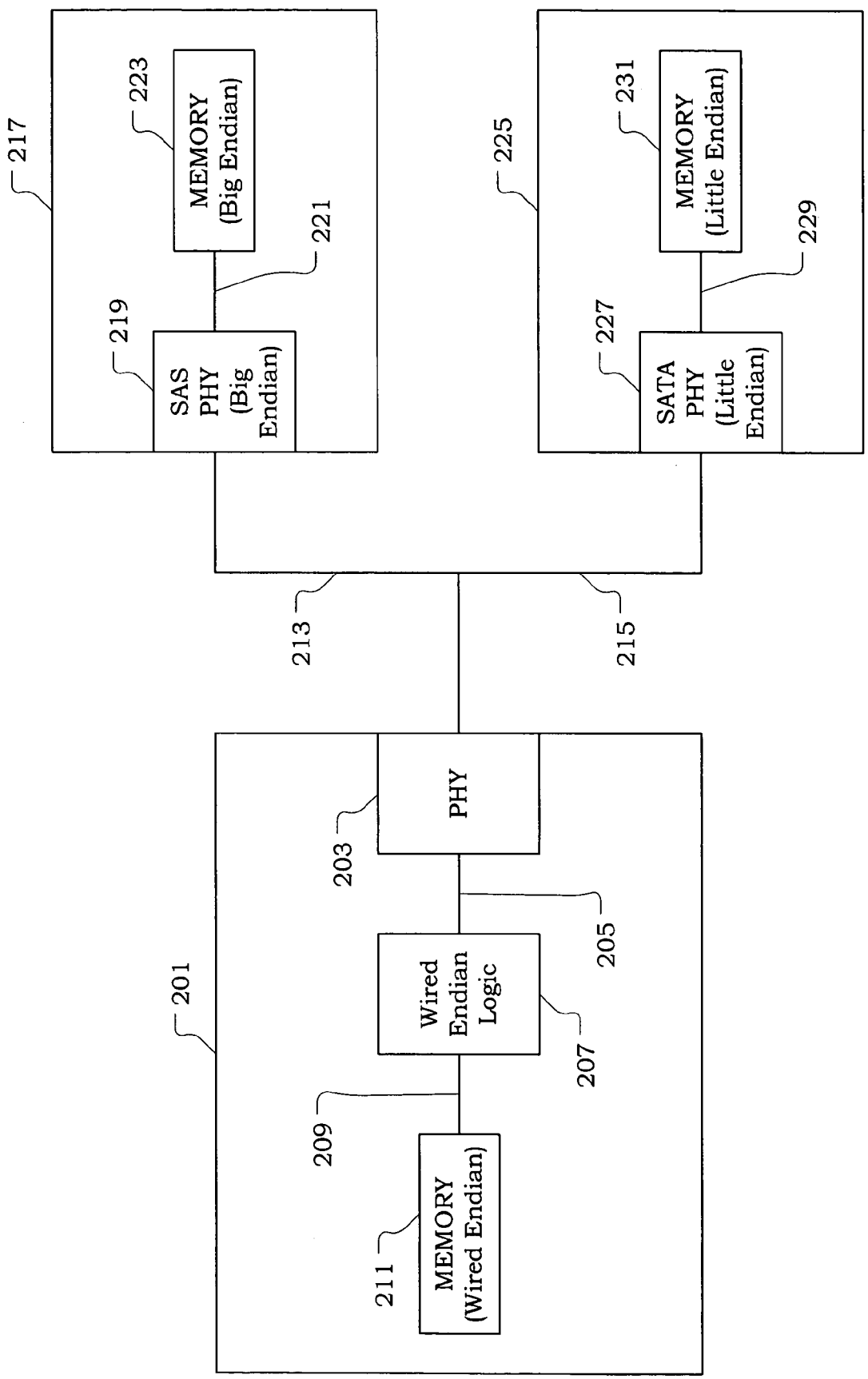
FIG. 2 is an illustration showing an electronic communication configuration, in accordance with one embodiment of the present invention.

FIG. 2 is an illustration showing an electronic communication configuration, in accordance with one embodiment of the present invention. In the configuration of FIG. 2, a device 201 is configured to operate in accordance with a wired endian format. The wired endian format represents a data storage and transmission format in which sequential bytes of a dword are stored and processed in transmit order. In the present discussion a dword represents a sequence of four contiguous bytes or four contiguous characters considered as a unit. In one embodiment, each byte of the dword is stored in one of four contiguous memory locations. The transmit order of the four byte dword sequence is defined to begin with a lowest memory address associated with the dword and progress consecutively through the remaining memory addresses associated with the dword. For example, consider a four byte dword sequence that is required to be transmitted in the following order to be compliant with protocol of a receiving device (i.e., a SAS device or a SATA device): Byte A transmitted first, Byte B transmitted second, Byte C transmitted third, Byte D transmitted fourth. In the present example, the wired endian format requires the four byte dword sequence to be stored as follows: Byte A in [base memory address], Byte B in [base memory address+1], Byte C in [base memory address+2], and Byte D in [base memory address+3]. Thus, in wired endian, Bytes A through D are stored in transmit order.

The device 201 includes a phy 203 for communicating with either a Serial Attached SCSI (SAS) device or a Serial ATA (SATA) device. The phy 203 represents a transceiver defined to transmit and receive communication signals. Thus, the phy 203 includes transmitter circuitry and receiver circuitry. The phy 203 is defined to communicate through a connection 205 with wired endian logic 207. The wired endian logic 207 is defined to communicate through a connection 209 with a memory 211. It should be appreciated that each of the wired endian logic 207, the memory 211, and other circuitry internal to the device 201 is configured to operate in accordance with the wired endian format.

The configuration of FIG. 2 also includes a SAS device 217 connected through a link 213 to the phy 203 of device 201. The SAS device 217 is defined to include a SAS phy 219 connected through a link 221 to a memory 223. The SAS device 217 is configured to operate in accordance with a SAS protocol based on a big endian format of storing and transmitting data. When storing or transmitting data in the big endian format, the most significant byte appears first. Thus, in a multi-byte value, the big endian format requires the byte containing the most significant bit to be stored in the lowest memory address and transmitted first, and the byte containing the least significant bit to be stored in the highest memory address and transmitted last.

The configuration of FIG. 2 further includes a SATA device 225 connected through a link 215 to the phy 203 of device 201. The SATA device 225 is defined to include a SATA phy 227 connected through a link 229 to a memory 231. The SATA device 225 is configured to operate in accordance with a SATA protocol based on a little endian format of storing and transmitting data. When storing or transmitting data in the little endian format, the least significant byte appears first. Thus, in a multi-byte value, the little endian format requires the byte containing the least significant bit to be stored in the lowest memory address and transmitted first, and the byte containing the most significant bit to be stored in the highest memory address and transmitted last.

In accordance with the foregoing, the wired endian logic 207 and phy 203 are defined to interface the wired endian format of the device 201 with the big endian format of the SAS device 217 and the little endian format of the SATA device 225. It should be appreciated that implementation of the wired endian format in the device 201 enables communication with both the SAS device 217 and the SATA device 225 without requiring duplication of components within the device 201 to accommodate the big endian format of SAS and the little endian format of SATA. In other words, implementation of the wired endian format allows the device 201 to be able to communicate with both the SAS device 217 and the SATA device 225 without requiring separate big endian and little endian instantiations of various modules in order to be conversant with both the SAS and SATA protocols, respectively.

The wired endian logic 207 includes transmission logic defined to include discrimination circuitry, data sequence processing circuitry, and transmission circuitry. The discrimination circuitry is defined to identify a sequence of bytes in wired endian format that are to be transmitted as representing either a control sequence of bytes or a data sequence of bytes. The control sequence of bytes represents a primitive from either the SAS protocol or the SATA protocol. The data sequence of bytes represents anything other than a primitive.

The discrimination circuitry is connected to both the data sequence processing circuitry and the transmission circuitry. Upon identifying the sequence of bytes as representing the control sequence of bytes, the discrimination circuitry is defined to transfer the sequence of bytes to the transmission circuitry. However, upon identifying the sequence of bytes as representing the data sequence of bytes, the discrimination circuitry is defined to transfer the sequence of bytes to the data sequence processing circuitry.

The data sequence processing circuitry is defined to convert the data sequence of bytes from the wired format to a native format associated with a device to which the data sequence of bytes is to be transmitted. For example, if the data sequence of bytes is being transmitted to a SAS device, the native format is big endian to comply with the SAS protocol. Alternatively, if the data sequence of bytes is being transmitted to a SATA device, the native format is little endian to comply with the SATA protocol.

The data sequence processing circuitry is also defined to perform pre-transmission processing on the data sequence of bytes while in the native format. The pre-transmission processing can include cyclic redundancy check data generation and scrambling of the data contained within the data sequence of bytes, among other processes. It should be appreciated that the data sequence processing circuitry of the transmission logic can be defined to direct one or more of the pre-transmission processes to be performed by circuitry disposed outside of the transmission logic. It should be further appreciated that the data sequence of bytes may be altered during the pre-transmission processing. For example, following a scrambling operation, the data sequence of bytes is represented as a scrambled version of the initial data sequence of bytes. Nevertheless, for discussion purposes, the data sequence of bytes prior to and following the pre-transmission processing is referred to as the data sequence of bytes.

Upon completion of the pre-transmission processing, the data sequence processing circuitry is further defined to convert the data sequence of bytes from the native format back to the wired endian format. Following conversion back to the wired endian format, the data sequence of bytes is transferred to the transmission circuitry.

The transmission circuitry is defined to transmit each byte of the sequence of bytes through the phy 203 in accordance with the wired endian protocol. Since the wired endian protocol maintains the sequence of bytes in the required transmit order, the sequence of bytes will be transmitted in the correct order.

In addition to the transmission logic, the wired endian logic 207 includes receipt logic defined to include receiving circuitry, discrimination circuitry, data sequence processing circuitry, and conversion circuitry. The receiving circuitry is defined to receive a sequence of bytes in a native format associated with a device from which the sequence of bytes is transmitted. Again, the native format for a SAS device is big endian, and the native format for a SATA device is little endian.

The discrimination circuitry of the receipt logic is defined to identify a sequence of bytes in native format as representing either a control sequence of bytes or a data sequence of bytes. Again, the control sequence of bytes represents a primitive from either the SAS protocol or the SATA protocol. The data sequence of bytes represents anything other than a primitive. If the sequence of bytes is identified as representing a control sequence of bytes, the sequence of bytes is transferred to the conversion circuitry. However, if the sequence of bytes is identified as representing a data sequence of bytes, the sequence of bytes is transferred to the data sequence processing circuitry.

The data sequence processing circuitry is defined to perform receipt processing on the received data sequence of bytes. The receipt processing can include unscrambling the data sequence of bytes and generating CRC data, among other operations. Upon completion of the receipt processing, the data sequence processing circuitry is defined to transfer the data sequence of bytes to the conversion circuitry. The conversion circuitry is defined to convert the sequence of bytes from the native format to the wired endian format. Once in wired endian format, the sequence of bytes is made available to the device for further processing.

Figure 3:
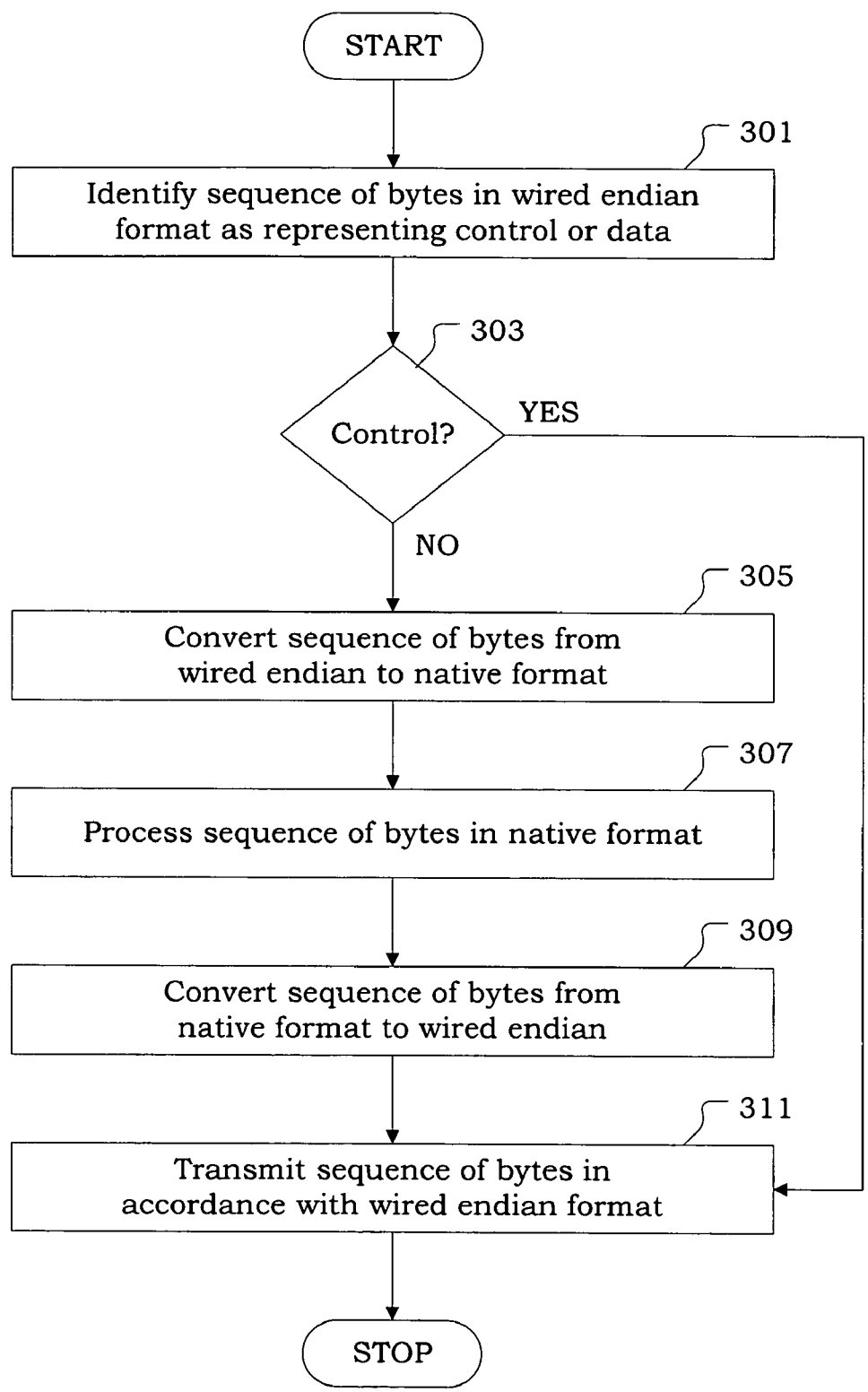
FIG. 3 is an illustration showing a flowchart of a method for operating a wired endian device to perform a transmission operation, in accordance with one embodiment of the present invention.

FIG. 3 is an illustration showing a flowchart of a method for operating a wired endian device to perform a transmission operation, in accordance with one embodiment of the present invention. The method begins with an operation 301 in which a sequence of bytes to be transmitted is identified as representing either a control sequence of bytes or a data sequence of bytes. The sequence of bytes is maintained in the wired endian format during the operation 301. The control sequence of bytes is defined as a primitive in either the SAS or SATA protocol. The data sequence of bytes is defined as anything other than a primitive in either the SAS or SATA protocol. Upon identifying the sequence of bytes as the control sequence of bytes, an operation 303 is provided for directing the method to proceed with an operation 311. In the operation 311, the sequence of bytes is transmitted in accordance with the wired endian format. The wired endian format requires that the sequence of bytes be maintained in a required transmit order. It should be appreciated that the transmit order of bytes used to define control primitives is the same in both SAS and SATA. For example, an ALIGN(0) primitive in both SAS and SATA is defined by an identical sequence of four bytes. In transmit order, each consecutive byte defining the ALIGN(0) primitive represents a K28.5 bit pattern, a D10.2 bit pattern, a D10.2 bit pattern, and a D27.3 bit pattern. Those skilled in the art will recognize the K28.5, D10.2, and D27.3 bit patterns as being associated with both the SAS and SATA protocols. In one embodiment, bytes are transmitted from low to high memory addresses. In this embodiment, the wired endian format requires the first byte to be transmitted to be maintained in the lowest memory address with the other bytes to be maintained in consecutively higher memory addresses according to the required transmit order. During transmission, bytes will be transmitted from consecutive memory address beginning with the lowest memory address. With reference to the previous ALIGN(0) example, the wired endian format requires the K28.5 byte to be stored in the lowest memory address and the D27.3 byte to be stored in the highest memory address, wherein the lowest and highest memory addresses are defined relative to the memory addresses associated with the sequence of bytes.

If the sequence of bytes is identified as the data sequence of bytes, the operation 303 directs the method to proceed with an operation 305. In the operation 305, the sequence of bytes is converted from the wired endian format to a native format. The native format represents a format associated with a device to which the sequence of bytes is to be transmitted. For example, if the device to which the sequence of bytes is to be transmitted is a SAS device, the native format is the big endian format. However, if the device is a SATA device, the native format is the little endian format. The method proceeds from the operation 305 to an operation 307 for processing the sequence of bytes in native format. Processing the sequence of bytes in native format includes generating CRC data and scrambling the data represented by the sequence of bytes. The CRC data generation and data scrambling is performed in accordance with the protocol of the device to which the sequence of bytes is to be transmitted. It should be appreciated, however, that the CRC data generation can be performed for either the SAS protocol or the SATA protocol using a single instantiation of CRC data generation circuitry, wherein appropriate initialization and data flow is provided for the respective protocol. Also, it should be appreciated that the data scrambling can be performed for either the SAS protocol or the SATA protocol using a single instantiation of data scrambling circuitry, wherein appropriate initialization and data flow is provided for the respective protocol. From the operation 307, the method proceeds to an operation 309 in which the sequence of bytes is converted from the native format to the wired endian format. Following the operation 309, the method proceeds with the operation 311, as previously described, for transmitting the sequence of bytes in accordance with the wired endian protocol.

Figure 4:
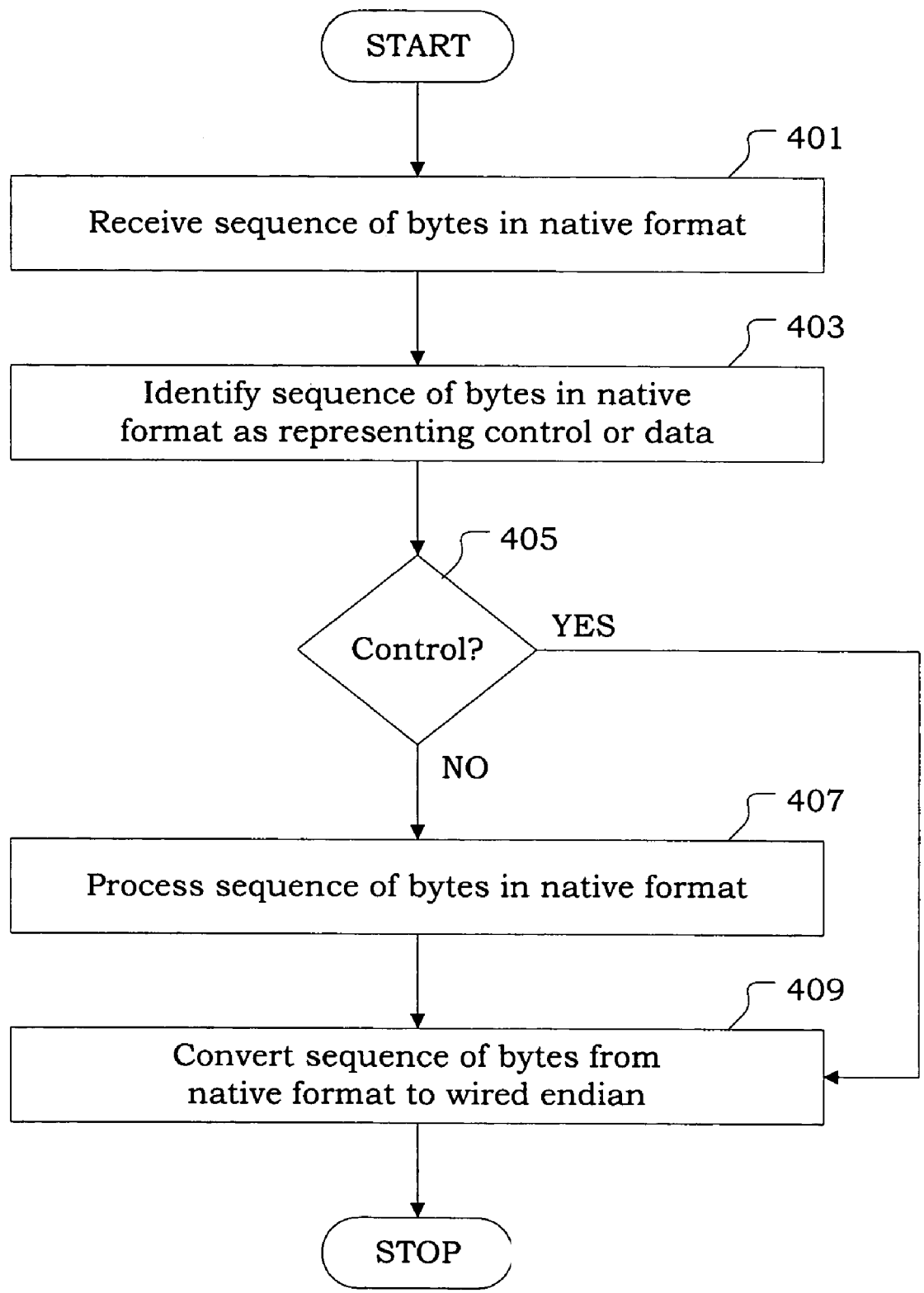
FIG. 4 is an illustration showing a flowchart of a method for operating a wired endian device to receive a transmission, in accordance with one embodiment of the present invention.

FIG. 4 is an illustration showing a flowchart of a method for operating a wired endian device to receive a transmission, in accordance with one embodiment of the present invention. The method begins with an operation 401 in which a sequence of bytes is received in a native format. The native format represents a format associated with a device from which the sequence of bytes was transmitted. The method continues with an operation 403 for identifying the received sequence of bytes as representing either a control sequence of bytes or a data sequence of bytes. The sequence of bytes is maintained in the native format during the operation 403. Upon identifying the sequence of bytes as the control sequence of bytes, an operation 405 is provided for directing the method to proceed with an operation 409. In the operation 409, the sequence of bytes is converted from the native format to the wired endian format.

If the sequence of bytes is identified as the data sequence of bytes, the operation 405 directs the method to proceed with an operation 407. In the operation 407, the data sequence of bytes is processed while being retained in the native format. The processing in operation 407 includes unscrambling the data sequence of bytes and generating CRC data based on the unscrambled data sequence of bytes. Upon completion of the operation 407, the method proceeds to the operation 409 for converting the sequence of bytes from the native format to the wired endian format.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. An apparatus defined to communicate electronically with each of a Serial Attached SCSI (SAS) protocol device and a Serial ATA (SATA) protocol device, comprising:
 a phy configured to connect the apparatus to each of the SAS protocol device and the SATA protocol device;
 wired endian logic configured to communicate through the phy, the wired endian logic configured to interface a wired endian format of the apparatus with each of a big endian format of the SAS protocol device and a little endian format of the SATA protocol device; and
 internal circuitry configured to operate in accordance with the wired endian format,
 wherein the wired endian logic includes receipt logic including,
 receiving circuitry defined to receive a sequence of bytes in a native format associated with a device from which the data sequence of bytes is to have been transmitted,
 discrimination circuitry defined to identify the sequence of bytes in native format as one of a control sequence of bytes and a data sequence of bytes,
 data sequence processing circuitry defined to perform receipt processing on the data sequence of bytes while in native format, the receipt processing including unscrambling of the data sequence of bytes and cyclic redundancy check data generation, and
 conversion circuitry defined to convert the sequence of bytes from the native format to the wired endian format.

2. An apparatus defined to communicate electronically with each of a SAS protocol device and a SATA protocol device as recited in claim 1, wherein the internal circuitry configured to operate in accordance with the wired endian format is defined to store and process a sequence of bytes in transmit order.

3. An apparatus defined to communicate electronically with each of a SAS protocol device and a SATA protocol device as recited in claim 2, wherein the sequence of bytes is represented as a sequence of four bytes being stored in consecutive memory locations, the transmit order defined to begin with a lowest memory address associated with the sequence of bytes and progress consecutively through the remaining memory addresses associated with the sequence of bytes.

4. An apparatus defined to communicate electronically with each of a SAS protocol device and a SATA protocol device as recited in claim 1, wherein the wired endian logic includes transmission logic including,
 discrimination circuitry defined to identify a sequence of bytes in wired endian format as one of a control sequence of bytes and a data sequence of bytes,
 data sequence processing circuitry defined to convert the data sequence of bytes from the wired endian format to a native format associated with a device to which the data sequence of bytes is to be transmitted, the data sequence processing circuitry also being defined to perform pre-transmission processing on the data sequence of bytes while in native format, the data sequence processing circuitry being further defined to convert the data sequence of bytes from the native format back to the wired endian format upon completion of pre-transmission processing, and
 transmission circuitry defined to transmit the sequence of bytes in wired endian format.

5. An apparatus defined to communicate electronically with each of a SAS protocol device and a SATA protocol device as recited in claim 4, wherein the control sequence of bytes represents one of a Serial Attached SCSI (SAS) primitive and a Serial ATA (SATA) primitive.

6. An apparatus defined to communicate electronically with each of a SAS protocol device and a SATA protocol device as recited in claim 4, wherein the data sequence processing circuitry is defined to represent the native format as the big endian format for the SAS protocol device and the little endian format for the SATA protocol device.

7. An apparatus defined to communicate electronically with each of a SAS protocol device and a SATA protocol device as recited in claim 4, wherein the pre-transmission processing includes cyclic redundancy check data generation and scrambling of the data sequence of bytes.

8. An apparatus defined to communicate electronically with each of a SAS protocol device and a SATA protocol device as recited in claim 1, wherein the control sequence of bytes represents one of a Serial Attached SCSI (SAS) primitive and a Serial ATA (SATA) primitive.

9. An apparatus defined to communicate electronically with each of a SAS protocol device and a SATA protocol device as recited in claim 1, wherein the receiving circuitry is defined to represent the native format as the big endian format for the SAS protocol device and the little endian format for the SATA protocol device.

* * * * *